United States Patent
Wagener et al.

(10) Patent No.: US 10,416,640 B2
(45) Date of Patent: Sep. 17, 2019

(54) METHOD AND DEVICE FOR MANAGING AND CONFIGURING FIELD DEVICES IN AN AUTOMATION INSTALLATION

(71) Applicant: ABB TECHNOLOGY AG, Zurich (CH)

(72) Inventors: Dirk Wagener, Stadthagen (DE); Christoph Welte, Neu-Ulm (DE); Marcus Heege, Kaisersesch (DE); Wolfgang Mahnke, Hettenleidelheim (DE); Marko Schlueter, Espelkamp (DE)

(73) Assignee: ABB SCHWEIZ AG, Baden (CH)

( * ) Notice: Subject to any disclaimer, the term of this patent is extended or adjusted under 35 U.S.C. 154(b) by 168 days.

(21) Appl. No.: 14/940,195

(22) Filed: Nov. 13, 2015

(65) Prior Publication Data
US 2016/0139581 A1    May 19, 2016

(30) Foreign Application Priority Data
Nov. 14, 2014    (DE) .................. 10 2014 016 819

(51) Int. Cl.
*G05B 19/042*    (2006.01)
*G05B 19/418*    (2006.01)

(52) U.S. Cl.
CPC ..... *G05B 19/0426* (2013.01); *G05B 19/4188* (2013.01); *Y02P 90/02* (2015.11)

(58) Field of Classification Search
CPC ...... G05B 19/0426; G05B 2219/23189; Y02P 90/02
See application file for complete search history.

(56) References Cited

U.S. PATENT DOCUMENTS

| | | | |
|---|---|---|---|
| 6,748,476 B2 * | 6/2004 | Hagino | G06F 13/385 709/220 |
| 7,039,745 B2 * | 5/2006 | Hagino | G06F 13/385 370/389 |

(Continued)

FOREIGN PATENT DOCUMENTS

| | | |
|---|---|---|
| CN | 101287743 A | 10/2008 |
| CN | 101393430 A | 3/2009 |

(Continued)

*Primary Examiner* — Charles R Kasenge
(74) *Attorney, Agent, or Firm* — Leydig, Voit & Mayer, Ltd.

(57) ABSTRACT

A method/device for managing and configuring field devices in an automation installation with a configuration tool designed to physically identify a field device in the automation installation and logically identify its field device type, to logically incorporate and configure it into the automation installation, the tool to this end resorting to a prescribed field-device-type-specific information package at least partially describing functions and data of the field device type. Parameterizing a plurality of field devices of the same type may be achieved by forming a first individual field-device-specific information package for a first field device from the field-device-type-specific information package, and a further individual field-device-specific information package for each further field device of the same type from the first individual field-device-specific information package, by first of all duplicating the first individual field-device-specific information package, then individualizing it for the further field device.

10 Claims, 1 Drawing Sheet

(56) References Cited

U.S. PATENT DOCUMENTS

| | | | | |
|---|---|---|---|---|
| 7,072,987 B2* | 7/2006 | Jurisch | G05B 19/042 | |
| | | | 700/17 | |
| 7,502,707 B2* | 3/2009 | Da Silva Neto | | |
| | | | G05B 19/41845 | |
| | | | 340/870.01 | |
| 7,693,688 B2* | 4/2010 | Da Silva Neto | | |
| | | | G05B 19/41845 | |
| | | | 340/870.01 | |
| 7,984,199 B2* | 7/2011 | Ferguson | G06F 8/60 | |
| | | | 709/220 | |
| 8,898,498 B2* | 11/2014 | Seiler | G05B 13/025 | |
| | | | 713/323 | |
| 9,261,871 B2* | 2/2016 | Rafael | G05B 19/042 | |
| 9,389,596 B2* | 7/2016 | Esposito | G05B 11/01 | |
| 9,411,769 B2* | 8/2016 | Erni | G05B 19/4185 | |
| 9,719,887 B2* | 8/2017 | Ratilla | G05B 19/0426 | |
| 2001/0016891 A1* | 8/2001 | Hagino | G06F 13/385 | |
| | | | 710/305 | |
| 2004/0196844 A1* | 10/2004 | Hagino | G06F 13/385 | |
| | | | 370/389 | |
| 2005/0222698 A1 | 10/2005 | Eryurek et al. | | |
| 2007/0250180 A1* | 10/2007 | Bump | G05B 19/41845 | |
| | | | 700/1 | |
| 2008/0301270 A1* | 12/2008 | John | G05B 19/0421 | |
| | | | 709/221 | |
| 2009/0076628 A1 | 3/2009 | Smith et al. | | |
| 2009/0228611 A1* | 9/2009 | Ferguson | G06F 8/60 | |
| | | | 710/8 | |
| 2012/0036568 A1* | 2/2012 | Kodama | G05B 19/0423 | |
| | | | 726/7 | |
| 2012/0084324 A1 | 4/2012 | Lloyd et al. | | |
| 2012/0235479 A1* | 9/2012 | Seiler | G05B 19/042 | |
| | | | 307/11 | |
| 2012/0303144 A1* | 11/2012 | Grossmann | G05B 19/0426 | |
| | | | 700/90 | |
| 2013/0257627 A1* | 10/2013 | Rafael | G05B 19/042 | |
| | | | 340/691.6 | |
| 2014/0025186 A1* | 1/2014 | Ojha | G05B 19/0426 | |
| | | | 700/83 | |
| 2015/0058778 A1* | 2/2015 | Tokuoka | G05B 23/0224 | |
| | | | 715/771 | |
| 2015/0105871 A1 | 4/2015 | Ochsenreither | | |
| 2015/0233790 A1* | 8/2015 | Ratilla | G05B 19/0426 | |
| | | | 702/188 | |
| 2015/0233791 A1* | 8/2015 | Ratilla | G05B 19/0423 | |
| | | | 702/188 | |
| 2016/0092386 A1* | 3/2016 | Sakamoto | G06F 13/387 | |
| | | | 710/106 | |

FOREIGN PATENT DOCUMENTS

| | | |
|---|---|---|
| CN | 103250112 A | 8/2013 |
| DE | 10245890 B4 | 4/2004 |
| DE | 102009017816 A1 | 10/2010 |
| DE | 102012102518 A1 | 10/2010 |
| DE | 102010038458 A1 | 2/2012 |
| EP | 2565739 A2 | 3/2013 |
| WO | WO 2007121218 A2 | 10/2007 |

* cited by examiner

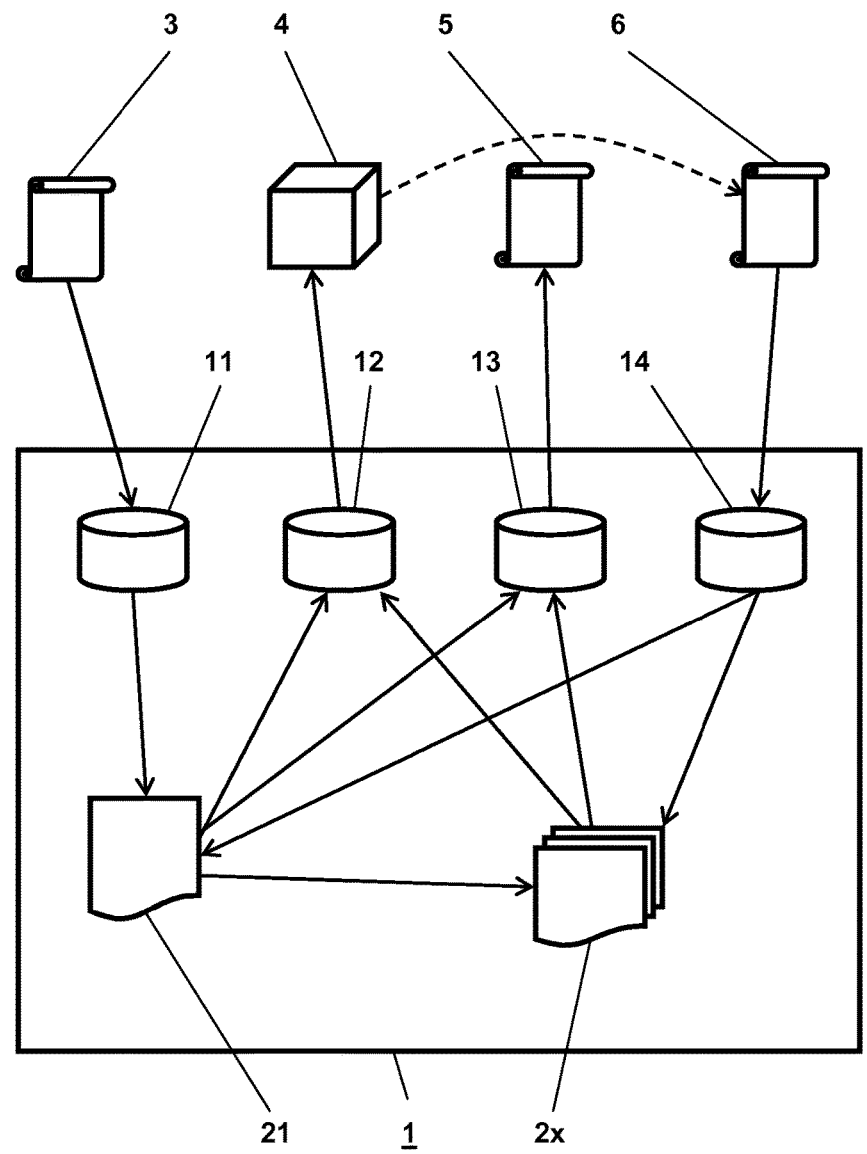

METHOD AND DEVICE FOR MANAGING AND CONFIGURING FIELD DEVICES IN AN AUTOMATION INSTALLATION

CROSS-REFERENCE TO RELATED APPLICATIONS

Priority is claimed to German Patent Application No. DE 10 2014 016 819.0, filed on Nov. 14, 2014, the entire disclosure of which is hereby incorporated by reference herein.

FIELD

The invention relates to a method and a device for managing and configuring field devices in an automation installation.

BACKGROUND

Automation systems for controlling a technical process or a technical installation usually comprise a control device (PLC), which are integrated in a complex comprising a multiplicity of intelligent electrical devices. Intelligent electronic devices are microprocessor-based devices such as protective and control devices, motor protection devices, intelligent switches and voltage regulators, frequency converters, pressure and temperature measurement transducers, flowmeters, and servodrives.

The Article "FDI Device Integration—Best of Both Worlds", atp edition 6/2010, pages 16 to 19, discloses the practice of integrating field devices with the FDI concept (Field Device Integration IEC-62769) into an automation installation. The basis for this concept is the provision of information for configuring field devices in a device-specific FDI package. This FDI package comprises a firmly prescribed quantity of information that consists of a device definition, business logic, user interface description, and user interface plugins. The device definition comprises management information and the device model. The business logic describes the communication logic for the device and is used for ensuring consistency for the device model. The user interface description describes the presentation of the device parameters and device functions. The user interface plugins are programmed components of interface portions for presenting the device parameters and functions.

When field devices are configured by means of EDD (electronic device description) technology IEC 61804, a device manufacturer provides an EDD that contains information about the communication with the device, the business logic and the user interfaces, that is to say what input masks should be presented to a user. By way of example, the business logic includes when what parameters can be written.

FDI technology uses these mechanisms of the EDD and provides the concept of the FDI package, in which, besides an EDD, other information such as a user handbook can be included, but also what are known as UIPs (user interface plugins), which provide further user interfaces in other technologies, such as .NET Assemblies, which, in contrast to EDD-based user interfaces, consists of programmed code compiled to form a component.

FDI packages are typically produced by device manufacturers and used by system manufacturers in order to integrate and configure the devices of the device manufacturers in their system.

In such a programming tool, information relating to the devices is visualized and functions such as parameterization operations are performed. To this end, the user first needs to select a device from a multiplicity of devices.

DE 102 45 890 B4 discloses a screen element, HMI device, automation system and computer program product for visualization and project planning for simply and repeatedly used user texts and the points of use that are assigned in a data processing system. The disclosure reveals that the devices are provided for selection in a hierarchic tree structure, with each branch that ramifies further having an associated user text and each branch that does not ramify further having an associated combination of a user text and a point of use. Details for a device are stored in nested menu levels. This turns operator control and particularly searching for details for a device into a time consuming process.

Typical industrial installations have a multiplicity of field devices of the same field device type. Frequently, the configurations of the field devices of the same field device type differ only in a few parameters. The number and type of parameters to be changed are often the same and usually relate to the two parameters "field device name" and "field device description".

The individual configuration of the multiplicity of field devices is very complex and, owing to the multiplicity of parameters that are accommodated, highly error prone.

SUMMARY

An aspect of the invention provides a method for managing and configuring one or more field devices of different field device types in an automation installation, the method comprising: logically incorporating a configuration tool into the automation installation, the configuration tool being configured to physically identify a field device in the automation installation, and the configuration tool being configured to logically identify its field device type; configuring the configuration tool in the automation installation, the configuration tool resorting to a prescribed field-device-type-specific information package describing functions and data of the field device type at least in part; forming a first individual field-device-specific information package once for a first field device of each field device type from the prescribed field-device-type-specific information package; and forming a second individual field-device-specific information package recursively for each further field device of the same field device type from the first individual field-device-specific information package, by first of all duplicating the first individual field-device-specific information package. and then individualizing the first individual field-device-specific information package for the further field device.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing, which illustrates the following:

FIG. 1 shows a basic illustration of a configuration tool designed to manage and configure field devices of different field device types in an automation installation.

DETAILED DESCRIPTION

Therefore, an aspect of the invention provides a method and a device for managing and configuring field devices in an automation installation, wherein the configuration of a multiplicity of field devices of the same field device type is simplified and the error rate is reduced.

An aspect of the invention relates to a method and a device for managing and configuring field devices in an automation installation, and an aspect of the invention can be used particularly in process automation or machine control for controlling processes and/or installation components.

An aspect of the invention is based on a device for managing and configuring field devices of different field device types in an automation installation with a configuration tool that is designed to physically identify a field device in the automation installation and to logically identify its field device type, to logically incorporate it into the automation installation and to configure it in the automation installation, wherein the configuration tool to this end resorts to a prescribed field-device-type-specific information package that describes the functions and data of the field device type at least in part.

For the method, the invention provides for a first individual field-device-specific information package to be formed once for a first field device of each field device type from the field-device-type-specific information package and for a further individual field-device-specific information package to be formed recursively for each further field device of the same field device type from the first individual field-device-specific information package by first of all duplicating the first individual field-device-specific information package and then individualizing it for the further field device.

For the device, there is provision for a first field device of each field device type to have an associated first individual field-device-specific information package that is formed from the field-device-type-specific information package, and for each further field device of the same field device type to have an associated further individual field-device-specific information package that is formed from the first individual field-device-specific information package and at least one individual parameter.

Specifically, a first individual field-device-specific information package is produced for the first field device of each field device type on the basis of the field-device-type-specific information package by means of individual configuration. The individual configuration of the first field device is checked for the functionality of the first individual field-device-specific information package.

This first individual field-device-specific information package is duplicated for each further field device of the same field device type and individualized by means of the addition and/or replacement of individual parameters for the respective field device.

In this way, a multiplicity of comprehensive individual configurations for a multiplicity of field devices of the same field device type is avoided. Instead, already-checked parameters are transferred to the further individual field-device-specific information package. This decreases the error rate in comparison with comprehensive individual configuration of each field device.

Furthermore, the complexity is limited to a single comprehensive individual configuration of the first field device of the respective field device type and the individualization of the configurations of all further field devices of the same field device type. The small degree of individualization—mentioned at the outset—of the individual field devices in comparison with the multiplicity of parameters means that the decrease in the time involvement, particularly in the case of extensive automation installations having a multiplicity of field devices of the same field device type, is of particularly significant advantage.

Even field devices configured in the same manner differ in at least one individual parameter. This includes the at least the physical address of the associated field device in the automation installation. Furthermore, the label for the field device in the automation installation—the "field device name"—and the "field device description" are individual parameters of each field device.

After the configuration is complete, each individual field-device-specific information package is loaded into the associated field device of the automation installation. In this way, the field device is allocated the parameters that are necessary for its use as intended.

Finally, each individual parameterization of a field device is documented with the associated individual field-device-specific information package. To this end, provision may be made for a configuration report to be printed. According to a further feature of the invention, the configuration tool has a database that stores the documentation of the individual configurations of the field devices of the automation installation.

According to a further feature of the invention, the configuration tool has a database that stores the individual field-device-specific information packages.

Advantageously, the configuration tool has each first individual field-device-specific information package, which is the basis for the duplication for producing a further individual field-device-specific information package, directly available. This prevents the first individual field-device-specific information package from needing to be loaded from the first field device for the purpose of duplication.

According to a further feature of the invention, the configuration tool has a database that stores the individual field-device-type-specific information packages.

Advantageously, the configuration tool has each individual field-device-type-specific information package, which is the basis for each first individual field-device-specific information package, directly available.

According to a further feature of the invention, the configuration tool has a database that stores the individual parameters of the physically identified field devices of the automation installation.

Advantageously, the configuration tool has a configuration list directly available, which configuration list allows individual parameters to be assigned to a further individual field-device-specific information package without user inputs. This increases fail-safety and prevents typing errors during the direct input of the names and descriptions.

The invention is explained in more detail below with the aid of an exemplary embodiment. The single FIGURE is a basic illustration of a configuration tool 1 that is designed to manage and configure field devices of different field device types in an automation installation 4. The automation installation 4 has a multiplicity of field devices—not shown in more detail—that belong to different field device types.

The configuration tool 1 resorts to a prescribed field-device-type-specific information package 3 that describes the functions and data of the field device type at least in part. This prescribed field-device-type-specific information package 3 may be formed by an EDD file that is provided by the manufacturer of the respective field device type. Alternatively, this prescribed field-device-type-specific information package 3 may be formed by an FDI package. For the purpose of configuring a field device, the associated field-device-type-specific information package 3 is read into the configuration tool 1.

In an advantageous embodiment of the invention, the configuration tool 1 has a database 11 that stores the prescribed field-device-type-specific information packages 3 for all field device types of the automation installation 4.

For the purpose of configuring a first field device of each field device type, a first individual field-device-specific information package 21 is formed once from the field-device-type-specific information package 3. This involves configuration of all the parameters that are required for the automation engineering task of this field device. Furthermore, the individual field-device-specific information package 21 has at least one individual parameter 6 added to it. Typically, the individual parameters 6 of each field device comprise a field device name, a field device description and the physical address of the respective field device in the automation installation 4. Furthermore, the individual field-device-specific information package 21 can have further individual parameters 6 added to it.

In a further embodiment of the invention, the configuration tool 1 has a database 14 that stores the individual parameters 6 of all the field devices of the automation installation 4. To this end, structural individual parameters 6 of each field device, such as the physical address, are derived from the physical and logical structure of the automation installation 4 and are augmented by descriptive details.

The first individual field-device-specific information package 21 is loaded into the relevant field device and tested.

For the purpose of configuring a further field device of the same field device type, a further individual field-device-specific information package 2$x$ is formed from the first individual field-device-specific information package 21 by first of all duplicating the first individual field-device-specific information package 21 and then individualizing it for the further field device by adding individual parameters 6. The associated individual parameters 6 are obtained from the database 14 of the configuration tool 1.

In an advantageous embodiment of the invention, the appearance of the parameter input masks is always the same regardless of the field device type. This standard appearance assists in finding the relevant individual parameters 6 within all available field device parameters. Thus, provision may be made for different sensory field devices of the same field device type to be configurable individually for different measurement ranges. The standard appearance of the parameter input masks means that the measurement range parameter is always in the same place and is therefore easy to find.

All further individual field-device-specific information packages 2$x$ are loaded into the relevant field device and tested.

All the individual field-device-specific information packages 21 and 2$x$ are stored. In an advantageous embodiment of the invention, the configuration tool 1 has a database 12 that stores the field-device-specific information packages 21 and 2$x$ of all the field devices of the automation installation 4.

The configuration of the field devices of the automation installation 4 is documented. In an advantageous embodiment of the invention, the configuration tool 1 has a database 13 that stores the documentation 5. Furthermore, provision may be made for the documentation 5 to be printed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SYMBOLS

1 Configuration tool
11 . . . 14 Database
21, 2$x$ Field device specific information package
3 Prescribed field device type specific information package
4 Automation installation
5 Documentation
6 Individual parameter

The invention claimed is:

1. A method for managing and configuring field devices of different field device types in an automation installation, the method comprising:

logically incorporating a configuration tool into the automation installation, the configuration tool being configured to physically identify a field device in the automation installation, and the configuration tool being configured to logically identify its field device type;

configuring the configuration tool in the automation installation, the configuration tool receiving a prescribed field-device-type-specific information package describing functions and data of the field device type at least in part;

forming a first individual field-device-specific information package once for a first field device of each field device type from the prescribed field-device-type-specific information package; and forming a second individual field-device-specific information package recursively for each further field device of the same field device type from the first individual field-device-specific information package, by first duplicating the first individual field-device-specific information package from the first field device, and then individualizing the first individual field-devicespecific information package for the further field device, the individualizing comprising adding at least one individual parameter corresponding to the further field device and/or replacing at least one individual parameter of the first individual field-device-specific information package with at least one individual parameter corresponding to the further field device, wherein the at least one individual parameter corresponding to the further field device comprises a physical address of the further field device.

2. The method of claim 1, further comprising:

assigning individual parameters to physically identified field devices of the automation installation; and individualizing respective individual field-device-specific information packages by these individual parameters.

3. The method of claim 1, further comprising:

loading each individual field-device-specific information package into the associated field device of the automation installation.

4. The method of claim 1, further comprising:

documenting each individual parameterization of a field device with an associated individual field-device-specific information package.

5. A device for managing and configuring field devices of different field device types in an automation installation, the device comprising:

a configuration tool, designed to physically identify a field device in the automation installation, and to logically identify its field device type, to logically incorporate the field device into the automation installation, and to configure the field device in the automation installation, the configuration tool receiving a prescribed field-device-type-specific information package describing functions and data of the field device type at least in part, wherein a first field device of each field device type includes an associated first individual field-device-specific information package, formed from the field-device-type-specific information package, wherein each further field device of the same field device type includes an associated further individual field-device-specific information package, formed from a copy of the first individual field-device-specific information package and individualized by addition of at least one individual parameter corresponding to the further field device and/or replacement of at least one individual parameter of the first individual field-device-specific information package with at least one individual parameter corresponding to the further field device, and wherein the at least one individual parameter corresponding to the further field device comprises a physical address of the further field device.

6. The device of claim 5, wherein the at least one individual parameter comprises at least two individual parameters, and wherein a second of the at least two individual parameters of each further field device is a descriptor that is associated with each physically identified field device of the automation installation.

7. The device of claim 5, wherein the configuration tool includes a database configured to store the individual field-device-specific information packages.

8. The device of claim 5, wherein the configuration tool includes a database configured to store the individual field-device-type-specific information packages.

9. The device of claim 5, wherein the configuration tool includes a database configured to store the at least one individual parameter of physically identified field devices of the automation installation.

10. The device of claim 5, wherein the configuration tool includes a database configured to store documentation of individual configurations of the field devices of the automation installation.

* * * * *